No. 737,868. PATENTED SEPT. 1, 1903.
G. J. RECORD.
CAN HEADING AND DOUBLE SEAMING MACHINE.
APPLICATION FILED MAR. 24, 1902.
NO MODEL. 7 SHEETS—SHEET 2.

No. 737,868. PATENTED SEPT. 1, 1903.
G. J. RECORD.
CAN HEADING AND DOUBLE SEAMING MACHINE.
APPLICATION FILED MAR. 24, 1902.
NO MODEL. 7 SHEETS—SHEET 3.

No. 737,868. PATENTED SEPT. 1, 1903.
G. J. RECORD.
CAN HEADING AND DOUBLE SEAMING MACHINE.
APPLICATION FILED MAR. 24, 1902.
NO MODEL. 7 SHEETS—SHEET 4.
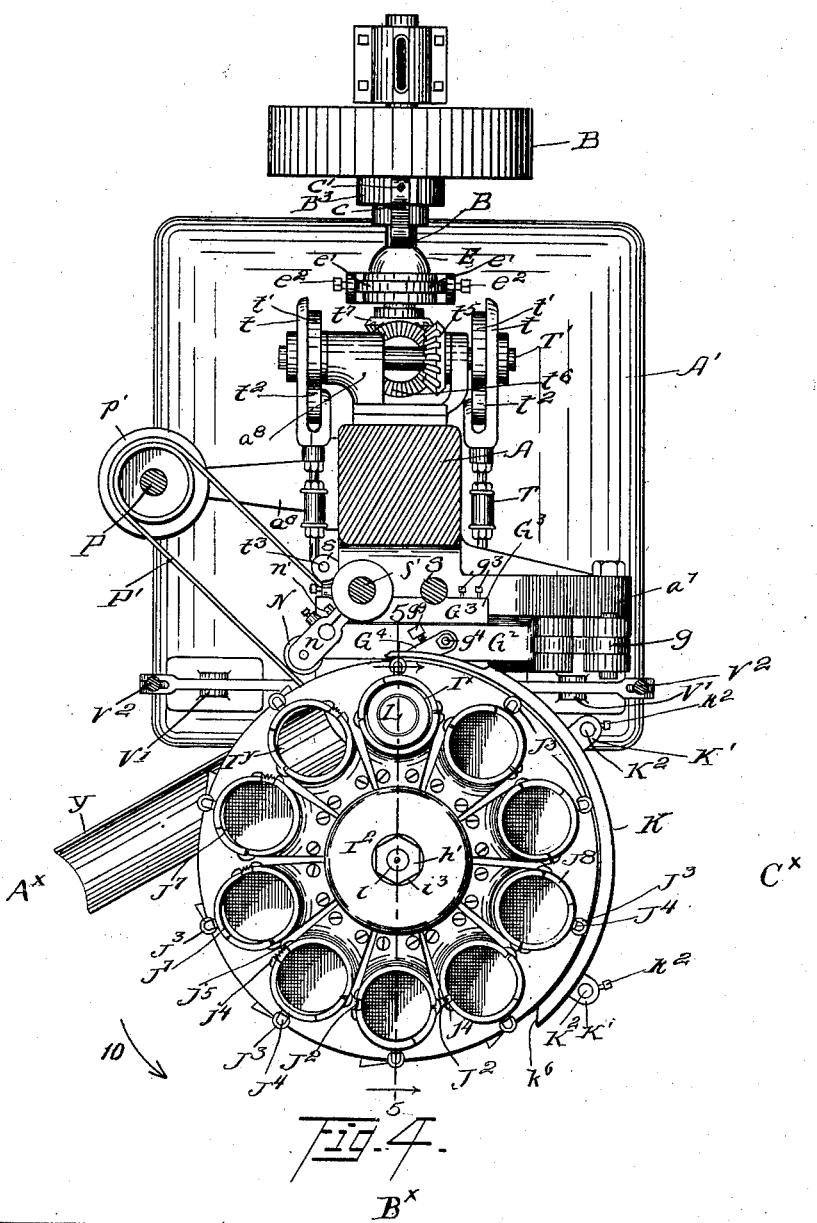

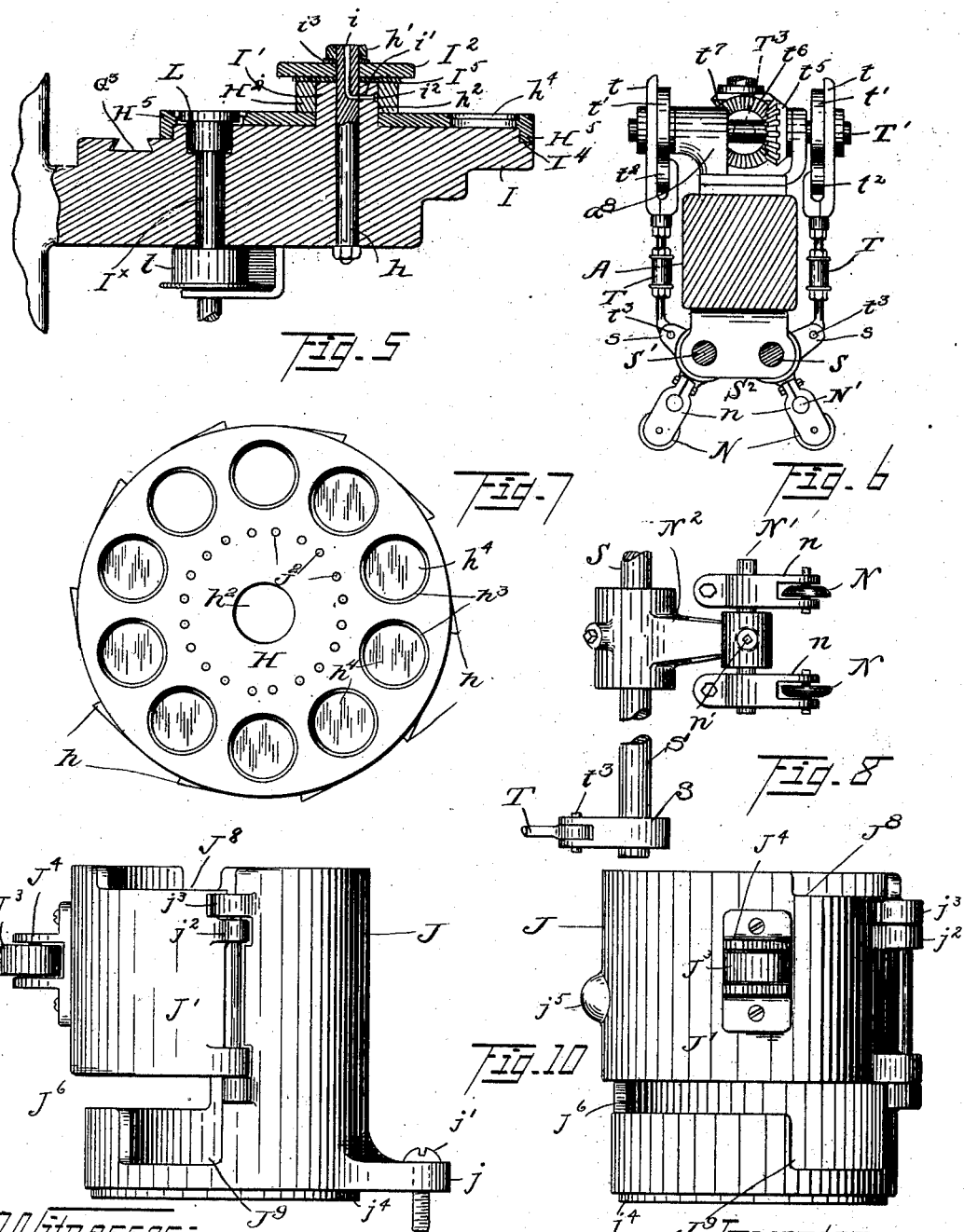

No. 737,868. PATENTED SEPT. 1, 1903.
G. J. RECORD.
CAN HEADING AND DOUBLE SEAMING MACHINE.
APPLICATION FILED MAR. 24, 1902.
NO MODEL. 7 SHEETS—SHEET 6.
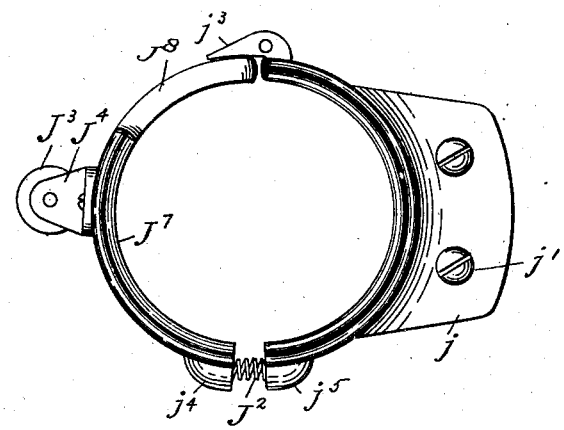
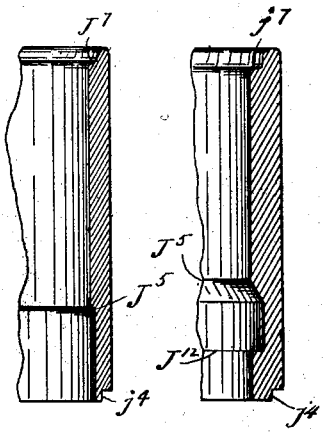
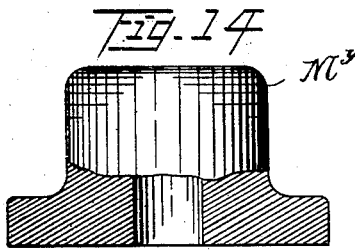
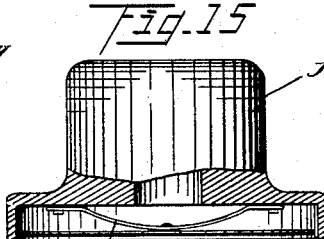
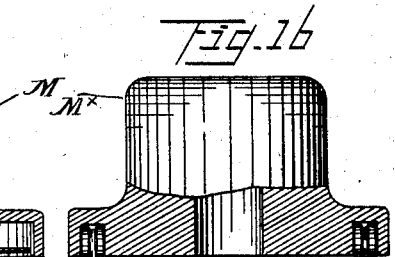
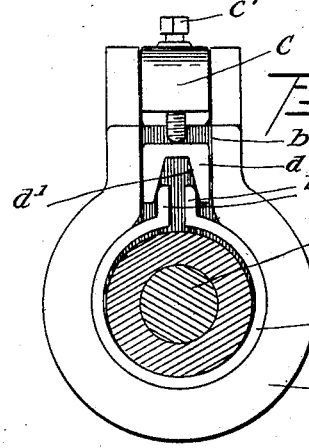
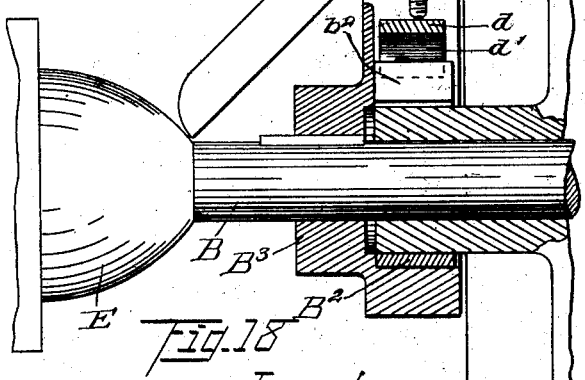
Witnesses:
Inventor.

No. 737,868. PATENTED SEPT. 1, 1903.
G. J. RECORD.
CAN HEADING AND DOUBLE SEAMING MACHINE.
APPLICATION FILED MAR. 24, 1902.
NO MODEL. 7 SHEETS—SHEET 7.

No. 737,868. Patented September 1, 1903.

UNITED STATES PATENT OFFICE.

GEORGE J. RECORD, OF CONNEAUT, OHIO, ASSIGNOR TO AMERICAN CAN COMPANY, OF JERSEY CITY, NEW JERSEY, A CORPORATION OF NEW JERSEY.

CAN HEADING AND DOUBLE-SEAMING MACHINE.

SPECIFICATION forming part of Letters Patent No. 737,868, dated September 1, 1903.

Application filed March 24, 1902. Serial No. 99,765. (No model.)

*To all whom it may concern:*

Be it known that I, GEORGE J. RECORD, a citizen of the United States, residing in Conneaut, in the county of Ashtabula and State of Ohio, have invented a new and useful Improvement in Can Heading and Double-Seaming Machines, of which the following is a specification.

This invention has for its chief object to provide an automatic can-heading machine equally well adapted to operate by crimping or double-seaming any size of can or other sheet-metal receptacle and also available for turning a hollow wire on the edge of an open vessel and for beading a can having a raised reduced neck; also, to effectually protect the can-bodies from being pressed out of shape or injured during the working of the machine and to remedy any imperfection of this kind which may have already occurred; also, to guard against all risk of displacement of the heads after being inserted in the can and to insure the accuracy of their position in the machine; also, to provide satisfactory automatic top and bottom head-clamping devices, and generally to improve the construction and operation of the machine and extend its range of usefulness.

To these ends my invention consists in the novel construction of parts and devices and in the novel combinations of parts and devices herein shown or described.

Figure 1:
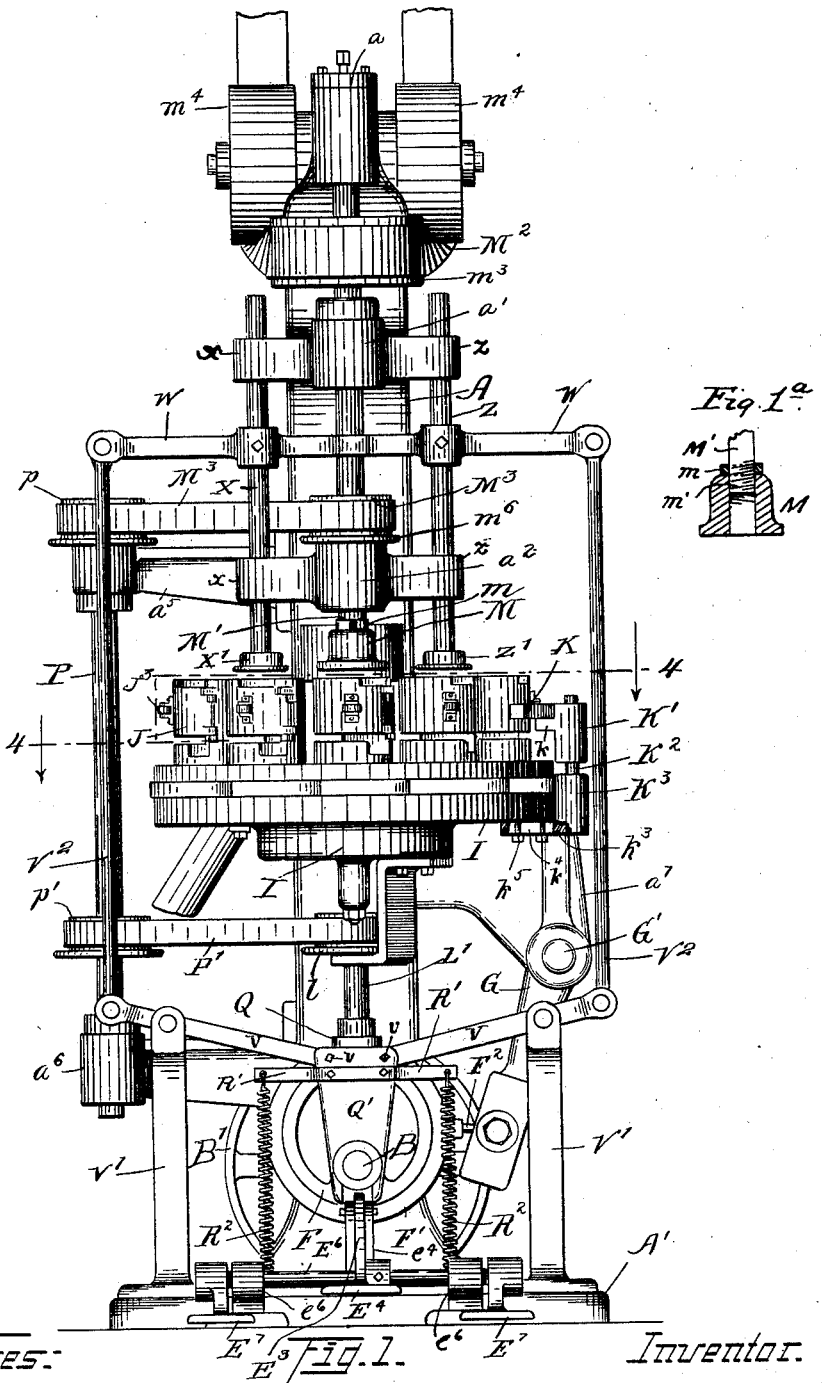
Figure 2:
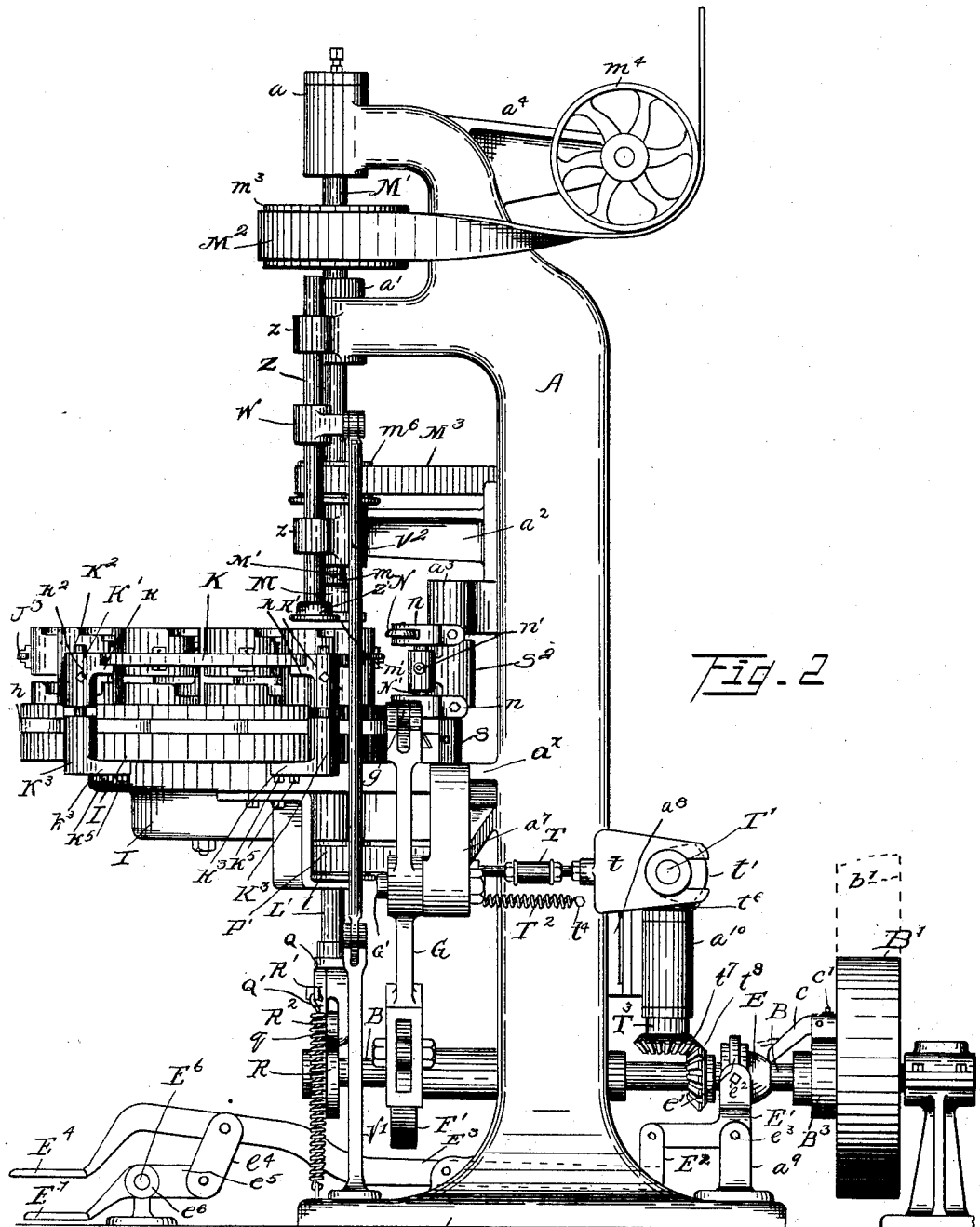
Figure 3:
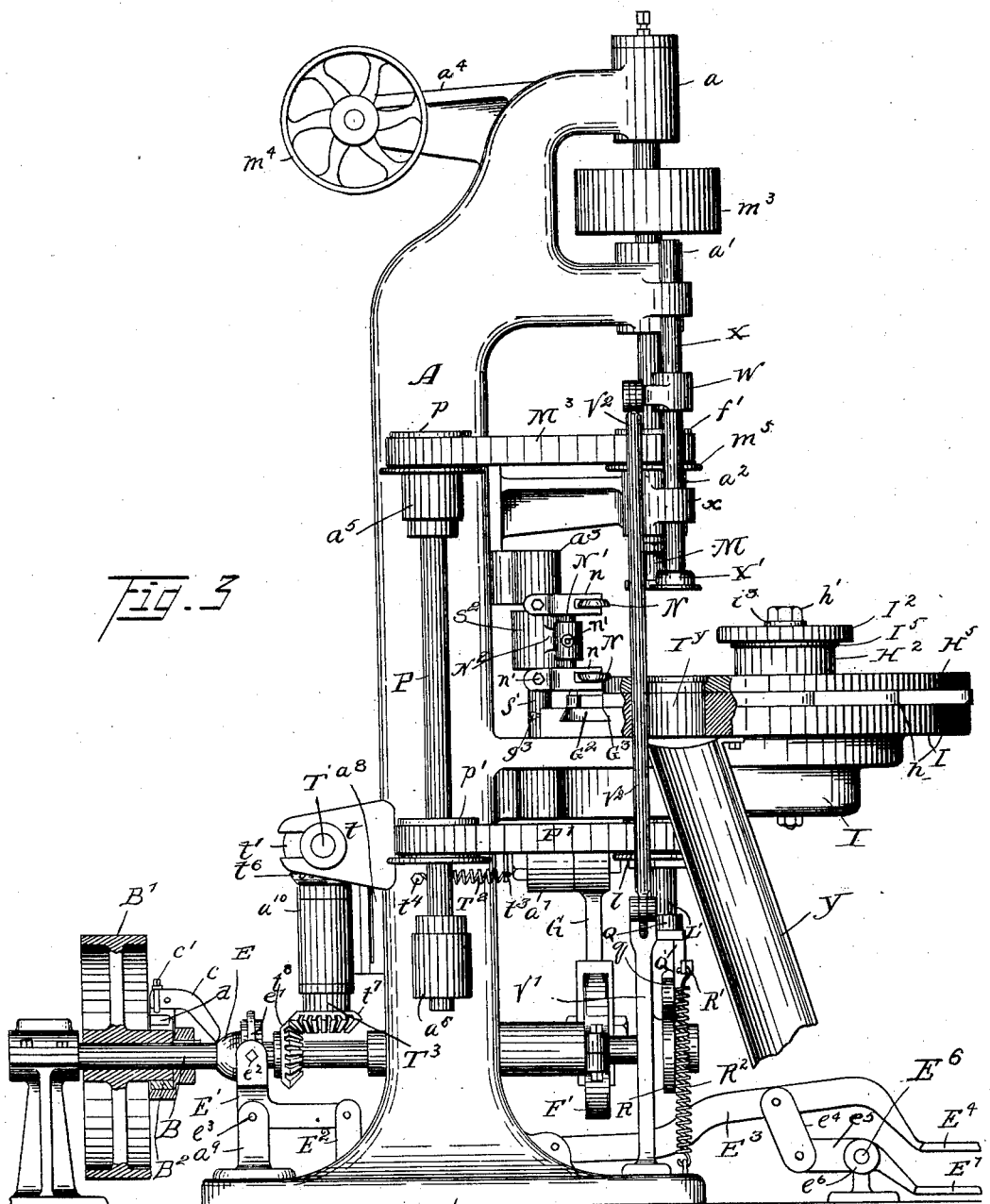
Figures 19, 20:
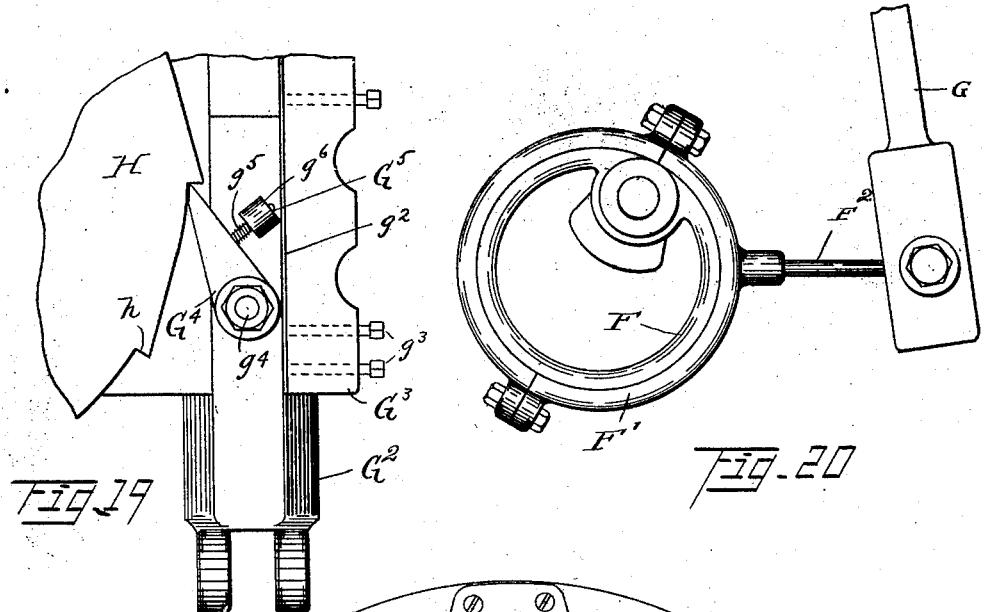
Figure 21:
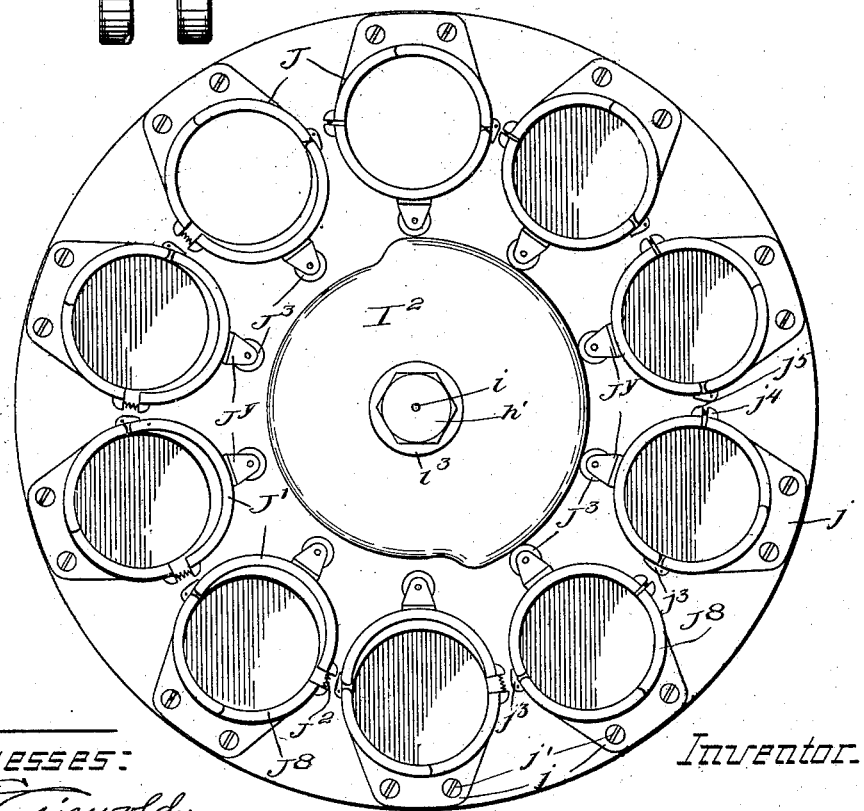

In the accompanying drawings, forming a part of this specification, Figure 1 represents a front elevation of a machine embodying my invention. Fig. 1$^a$ is a sectional view of one of the chucks. Fig. 2 represents a side elevation of the same. Fig. 3 represents a side elevation from the point of view opposite to that of Fig. 2. Fig. 4 represents a horizontal section on the line 4 4 of Fig. 1 looking downward. Fig. 5 represents a vertical section on line 5 5 of Fig. 4. Fig. 6 represents a section similar to Fig. 4 of the machine arranged for double-seaming. Fig. 7 represents a view of the rotary can-carrying disk or bed. Fig. 8 represents a detail elevation of the seaming-rollers. Figs. 9 and 10 represent a detail elevation of one of the can-pockets or casing. Fig. 11 is a plan view of one of the can-holding casings. Figs. 12 and 13 are vertical sections of portions of such casings, showing two forms of the same. Figs. 14, 15, and 16 are side elevations, partly in section, of the upper can-holding chuck, showing three forms of the same. Fig. 17 is an end view, partly in section, of the main power-clutch. Fig. 18 is a longitudinal section, partly in elevation, of the same. Fig. 19 is a plan view illustrating the means for rotating the can-carrying table. Fig. 20 is an elevation of the eccentric and part of the lever by which the mechanism shown in Fig. 19 is operated. Fig. 21 is a plan view showing a modified form of can-carrier.

In said drawings, A represents the upright cast-metal frame of the machine, having its base A' bolted on the floor and having front horizontal bearing-arms $a$ $a'$ $a^2$ $a^3$ $a^\times$, rear upper bearing-arms $a^4$, and lateral bearing-arms $a^5$ $a^6$ $a^7$, all cast therewith, the arms $a^5$ $a^6$ being on one side of the machine and the arm $a^7$ on the other. Horizontal bearing-brackets $a^8$ and $a^9$ and intermediate vertical bracket $a^{10}$ are bolted to the rear of the said frame near its base. In the said frame near its base a horizontal shaft B is journaled, provided at its rear end with a loose belt-wheel B', driven by a belt $b'$ from any convenient source of power. This wheel is connected to said shaft at will by a split band-clutch B$^2$, which grips its hub and is contained with a sleeve-form casing B$^3$, fast on said shaft, said casing being provided with a vertical passage $b^3$ to receive a vertically-movable clutch-operating slide $d$, bifurcated at its lower end and having the inner faces of its bifurcations beveled at $d'$, so that when it is forced down it will draw the lugs $b^2$ of said split band-clutch together.

C' is a screw-threaded pin having a threaded bearing in the rear arm of a small bell-crank lever C, pivoted on the said casing B$^3$, the lower end of said pin being arranged to bear downward on the top of the slide $d$. By the vertical adjustment of this pin the clutch may be regulated to allow for wear or contraction and to insure prompt working. The forward arm of the said lever curves downward for contact with the conical face of the sliding collar E, splined on the shaft and gripped by a strap $e'$, which is fastened by screws $e^2$ $e^2$ between the jaws of the bifurcated upper arm of a bell-crank lever $E'$, pivoted on a small shaft or spindle $e^3$, held in the lowest horizontal bracket $a^9$ aforesaid. The other end of this bell-crank lever is connected by a link $E^2$ to the rear end of a clutching and unclutching lever $E^3$, which is pivoted to a lug in the said frame just above the base $A'$ and extends through said frame to the front of the machine, where it is provided at its forward end with a treadle $E^4$ and mounted by a link $e^4$ on an arm $e^5$ of a rock-shaft $E^6$, turning in bearings $e^6$ and having on its ends treadles $E^7$. By the above connection the depression of treadle $E^4$ applies the clutch and the depression of either of the treadles $E^7$ unclutches the shaft.

Other forms of clutch and clutch-operating mechanism may be substituted for those above described, in which I do not claim any novelty.

The shaft B is provided in front of frame A with an eccentric F, turning in a ring or yoke $F'$, jointed by its arms $F^2$ to the lower end of an upright feeding-lever G, mounted on a pivot-bolt $G'$, attached to the right-hand lateral arm $a^7$ of the frame A. The upper end of this lever is connected by a link $g$ to a horizontal transversely-acting feeding-slide $G^2$, dovetailed in cross-section and working in a corresponding guideway $G^3$, which has in its rear side an antifriction facing-strip $g^2$ held in position by screws $g^3$. A stout pawl $G^4$, mounted on a stud $g^4$, raised on said slide, engages the peripheral teeth $h$ of a rotary disk or circular can-carrier H, being held in position for such engagement by the lateral pressure of a spring $g^5$ in a small casing $g^6$, also raised on said slide, this pressure being applied through a plunger $G^5$, supported and guided by said casing and protruding therefrom into contact with the rear side of the said pawl. The said disk or carrier H is supported on a fixed bed or table I of similar shape and diameter on the outer part of the longest and largest front bearing-arm $a^x$ and integral with frame A. The diameter of the upper part of the said table is, however, reduced, forming a lesser raised part $I^4$, which fits within an annular downward part $H^5$ of the said disk, guiding and holding the latter against the lateral displacement. This central recessing of the lower part of the said disk, whereby said annular part $H^5$ is left, also lightens it and lessens the necessary expenditure of power. A vertical center bolt $h$, passing down through the said table and receiving at its upper end a nut $h'$, prevents the disk or carrier H from rising from the said table if the force of gravity should be accidentally overcome. The said disk or carrier is provided with a central hole $h^2$ and a raised removable annular hub $H^2$, fitting on a strong cylindrical bearing $I'$, centrally raised on the table I and bored for the passage of the center bolt $h$. The upper end of the latter is centrally bored for a main oilway $i$, having at its lower end a branchway $i'$, extending to the outside of the bearing $I'$, where it supplies exterior passages $i^2$ for the lubrication of the contact-surfaces of the said hub and bearing. The said hub is surmounted by a circular cap $I^2$ of greater diameter, which remains fixed while the hub $H^2$ revolves with said disk or carrier H, although the said cap protects and hides the parts below it, making a neater appearance and is itself locked in place by the nut $h'$. A thin packing ring or disk $I^5$, of leather or any suitable material, is interposed between the said hub $H^2$ and the cap $I^2$ to lessen wear and act as a brake for preventing the momentum of the disk or carrier from turning it too far. The said disk or carrier H is provided with a circular series of holes $h^4$ in its upper face near the periphery, the wall of each hole having an annular inward flange $h^3$. Every hole $h^4$ receives one of a series of removable can pockets or casings J, which are preferably of cast-iron, though they may be of any suitable rigid material. Each casing J is provided at the bottom with a lateral screw-tapped foot $j$, fastened to the said disk or carrier by screws $j'$, that enter the screw-tapped recesses in the top of the said disk or carrier; also, with a thin annular downward extension $j^4$, which sets into the appropriate hole $h^4$ on the flange $h^3$ and fits closely against the wall of the said recess. The lower part of each pocket is continuous throughout its circuit and fixed at every part to the disk or carrier H; but its upper part is provided, as shown in Figs. 1, 2, 3, and 4, with a movable outer section or segment $J'$, occupying about one-half of its circumference and hinged at $j^2$ to the fixed part of the pocket, its outer opening being limited by lugs $j^3$ of the latter. A spring $J^2$, fitting at its ends into sockets $j^4$ and $j^5$ in the fixed and hinged section of the pockets or casings, normally holds the door or hinged section open as far as the said lugs allow, thus providing a pocket or receptacle of approximately circular form in cross-section, but sufficiently expanded to make it easy for the filler to supply the can-bodies thereto with swiftness and certainty. Each hinged section $J'$ is also provided with an antifriction-roller $J^3$, journaled between two lugs of a small bracket $J^4$, detachably fastened to the outer side.

The rotation of the disk or carrier H is, as shown, from left to right in the direction of the arrow 10, Fig. 4, by a step-by-step motion, each step being of course determined by the distance between the teeth $h$ and the length of play from the pawl $G^4$, acting thereon, and corresponding to the distance of the center of one pocket or casing J to the next. On the left or receiving side, as shown in Fig. 4, and at the front of the machine, the said pockets or carriers are left open; but during approximately the final third of the revolution they are automatically closed and so held by the wiping of the said antifriction-rollers against a curved horizontal closing-bar K, corresponding approximately to the periphery of the said disk and detachably fastened to supporting-lugs $k$ of blocks K', sleeved on vertical rods $K^2$ and fastened thereto by adjusting-screws $k^2$, which permit easy adjustment of the height of said closing-bar to conform to can-pockets and cans of different sizes. The rods $K^2$ are integral with blocks $K^3$, provided at the bottom with horizontal arms $k^3$, extending under a table or bed I and having slots $k^4$ to allow adjustment radially of said arms, blocks, or closing-bar by bolts $k^5$, which fasten the said arms to the said table. The chief utility of such adjustment of the said closing-bar is to regulate the closing of the pockets or casings, since for some work it is best not to close them completely. The end of the bar first struck by the rollers is beveled at $k^6$ to lessen the shock. On a line with the lower edge of the door or hinged section each pocket or casing increases in diameter to accommodate the bottom head of the can, which of course exceeds the circumference of the can-body until fastened thereon by crimping, bending, or rolling. This increase of diameter of the lower part of the interior of the pocket or casing leaves an internal shoulder $J^5$, extending around the fixed part thereon, which limits the upward movement of the bottom head of the can when raised, as hereinafter described, and assures that the parts shall retain their proper positions during the operation of seaming or beading.

Just under the hinged section of each carrier or casing a horizontal slot $J^6$ is provided in said casing for the admission of the tin bottom head or lower closing-disk of the can. In applying the head at the lower end thereof it has been found difficult to prevent displacement by reason of the centrifugal force and the lack of any sufficient means for guarding and guiding the head. The slot above described obviates these defects, since its upper and lower walls guide the tin disk or head securely into its proper position, and when the body of the can is pressed into the pocket or casing it forces the said head below the said slot, and the said body then closes the latter, so that the said bottom head cannot rise to this part and escape, while the material of the table I will prevent all escape below. The said bottom head is therefore obliged to retain a horizontal position below the lower edge of the can-body and the said carrier. The upper part of the interior of each casing or pocket is also enlarged in diameter for a very short distance from the top, leaving a shoulder $J^7$ just below the latter. This enlargement is to permit the introduction from above of the upper head or top closing-disk of the can, and the said shoulder supports it, preventing it from descending too far. An opening $J^8$ is made in the wall of the upper end of the casing down to said shoulder to allow a crimping-roller to act, as hereinafter described, on the upper head or top disk and contiguous upper end of the can. Also directly under it and connected with the slot $J^6$ aforesaid another opening $J^9$ is formed to allow a similar action of another crimping-roller on the bottom head or lower disk and contiguous lower end of the can-body.

Cans and similar receptacles have long been closed either by crimping or double-seaming the top and bottom heads of the body. Both methods are well known in the art and need not be particularly described here. Crimping requires the use of but a single roller at each end of the can to crimp or punch the V-grooved material of the bottom head or the lower edge of the body inserted therein; but double-seaming requires two such rollers for each end of the can, the first of said rollers folding the contiguous parts of the head and body together and the second one rolling them securely on each other. One of the conspicuous points of my machine is that it is adapted to do either kind of work with equal readiness by merely interchanging the casings or pockets and the operating-rollers, as desired. The casing thus far described is for use in crimping; but it may be used for double-seaming by simply increasing the number of seaming-rollers and increasing the number of the openings $J^8$ $J^9$ in the casing J, thus serving to allow the action of the two pairs of operating-rollers. The shoulders $J^5$ and $J^7$ in the interior of the casing or pockets for crimping, Fig. 12, are beveled, respectively, upward and downward to correspond to the beveled peripheral face of the V-grooved form of head used in crimping; but in the casing used for double-seaming I substitute for the upper shoulder $J^7$ a wider shoulder $j^7$, at right angles to the wall of the can, adapted to receive and support the flat peripheral form of head used in the latter procedure, and I have also provided a broad shoulder $J^{12}$, also at right angles to the wall of the can and at a point considerably below the shoulder $J^5$ for the support of the bottom head, Fig. 13. In crimping the bottom head may safely be allowed to reach the bottom of the casing, as the said upwardly-beveled shape precludes all risk of entanglement with or injury to the lower plunger hereinbefore described and the part through which it works; but the bottom head in double-seaming having a flat peripheral part, as explained, may get its edges in between the said parts if it reaches the bottom of the casing in a slightly-inclined position, in which case the machine should be stopped or injury would follow. For this reason the supporting-shoulder $J^{12}$ is provided, and the bottom head rests thereon considerably above the bottom of the casing with its peripheral part out of the way of harm until the said plunger rises to it, as hereinafter set forth.

Three fillers are usually employed, the first at the left side of the machine, the second at the front, and the third at the right—that is to say, respectively at the places indicated by $A^x$, $B^x$, and $C^x$ in Fig. 4. The first filler slips a bottom head for a can into each casing or pocket as it comes opposite her through the slot $J^6$. The second filler supplies the cylindrical body of the can to each casing as it comes opposite her, pressing it down through the top of the casing, which is loose enough to admit it readily and surrounds it equally on all sides, so that it is subject to no risk of indentation or distortion, the can-body also closing the said slot, as before described. The closing-bar K then acts on the antifriction-roller and automatically closes the casing, either completely or to a predetermined degree, thus not only retaining the perfect cylindrical shape of the can-body, but correcting any deviation therefrom if such has occurred. The can is thus held by said bar and closed pocket or casing until it passes to the crimping and heading rollers hereinafter described. During its passage along the said closing-bar the third filler places the upper head or top disk of the can into the upper end of the casing and on the upper internal shoulder $J^7$. This head is of course carried with the rest of the can to the said clamping device and heading-rollers. When it is desired to make a smaller can, a casing or pocket may be substituted having much thicker walls, so that the internal diameter is reduced without affecting the accuracy of the fit into the hole $h^4$ of the disk H or on the flange $h^3$. This avoids the necessity of removing the said disk or carrier and substituting another with smaller holes for the smaller cans, an expedient which may, however, be resorted to.

The table or supporting-bed I is provided in its rear part toward frame A with two holes $I^x$ and $I^y$. Through the hole $I^x$, which is first in the order of the travel of the cans, a plunger L, having a disk-form upper face, works up and down, also rotating therein, while a chuck or clamping-disk M, without vertical movement, rotates directly above it in a plane slightly above the top of the casing. Through the second hole $I^y$ the headed cans pass down a chute Y, which delivers them for removal. The function of the plunger or lower chuck L is to raise the bottom head to the body of the can if it is below the same, then to raise both of them together to the upper can-head, then to raise these three parts, as yet unattached, until the upper head is in contact with the upper chuck M, clamping them against the same, then in conjunction with said upper chuck to turn the can rapidly in contact with the crimping-rollers N, Figs. 1, 2, 3, and 4, (or double-seaming rollers,) thereby fastening the heads on the can-body, and finally to withdraw from the headed can, allowing it to pass on to the discharge-opening Y. There is no novelty in the rollers aforesaid, their forms being well known and determined by the particular work required.

The upper clamping-chuck M is screwed on the threaded lower end $m'$ of its shaft $M'$, allowing a certain amount of vertical adjustment and making it conveniently removable, permitting a thinner or thicker chuck to be substituted, which effects a further adjustment to suit the size of the can. A lock-nut $m$, turning on reversed threads above it, holds the said chuck against accidental dislodgment. The vertical shaft $M'$ has its bearing in the front arms $a$, $a'$, and $a^2$ of the casing aforesaid and is provided with a fast pulley $m^3$, receiving a driving-belt $M^2$, connecting with any convenient source of power and guided by pulleys $m^4$, having their bearings in the rear upper bearing-arms $a^4$ aforesaid. There is a practical advantage in driving this vertical shaft independent of the lower shaft B aforesaid, since either may easily be stopped without checking the other or the parts operated thereby. A short belt $M^3$ connects a pulley $m^6$ on the shaft $M'$ with a pulley $p$ on a vertical shaft P, having its bearing in lateral arms $a^5$ $a^6$ aforesaid and carrying a second pulley $p'$, connected in like manner by a belt $P'$ to a pulley 1 on the vertical shaft $L'$ of the plunger or lower chuck L, so that the latter is rotated by the rotation of the upper shaft $M'$. This lower shaft $L'$ has a bearing at its middle part in arm $a^x$, through which it passes, and is also stepped into a vertically-movable block Q, which is bifurcated at its bottom to receive an antifriction-roller $q$, in contact with a lifting-cam R, carried by a shaft B. The front of said block is extended down to form a slotted plate $Q'$, the lower end of which is bifurcated to straddle the end of the shaft B, so that the said block and vertical shaft $L'$ may be further braced and guided thereby. A horizontal bar $R'$ is bolted at its middle to the said plate, its ends being connected to the base $A'$ by strong retracting-springs $R^2$. The alternate action of said cam and springs of course maintains the reciprocation of the said shaft $L'$.

The crimping-rollers N, arranged to act simultaneously on the two heads of the can and crimp the same on the body, are mounted in bifurcated brackets or short horizontal arms $n$, fast on a vertical rod $N'$, which passes through and is clamped by screw $n'$ in the sleeve-form end of a horizontal arm $N^2$, rigid with a sleeve $S^2$, clamped on a vertical shaft S. This shaft has bearings in the arms $a^3$ and $a^x$. A short arm $s$ on the shaft S is joined to an adjustable connecting-rod T, carrying at its rear end a plate $t$, slotted or forked to pass a transverse shaft $T'$, journaled in a rear bearing-bracket $a^3$, said shaft $T'$ carrying a cam $t'$, which acts on a roller $t^2$, mounted in a bifurcation in the rear end of the said plate. A retracting-spring $T^2$ extends from a stud $t^3$ on the under side of arm $s$ to a stud $t^4$ in the side frame A. The shaft $T'$ is driven from shaft B by means of a short vertical connecting-shaft $T^3$ and bevel-wheels $t^5$ $t^6$ $t^7$ $t^8$ on these shafts, arranged and intermeshing as shown. The shaft $T^3$ is jointed in the vertical bearing-bracket $a^{10}$. The cam $t'$ and spring $T^2$ rock the shaft S to and fro, thus throwing the rollers N alternately into and out of position to act on the can, as described, for heading the same, such motion being calculated to bring them into operative position when the plunger L first lifts the can into position and it begins to turn with the clamping disks or chucks, while the withdrawal of the rollers is simultaneous with that of the said plunger or lower chuck. The shaft S', parallel and similar to shaft S and journaled, like it, in a double bearing-bracket $S^2$ and arm $a^3$, is in like manner acted on by a cam $t'$ and roller $t^2$, the latter being carried by a connecting-rod T and opposed by a spring $T^2$, connected to studs $t^3$ and $t^4$ on the shaft S' and frame A, respectively. The arm $N^2$, carried by said shaft S', corresponds to the arm $N^2$ aforesaid and is likewise provided with a screw $n'$, in which at will is inserted the rod N', corresponding to rod N', which rod N' may carry a second pair of rollers for double-seaming. In double seaming double-seaming rollers are substituted for crimping-rollers N. The form of both kinds of rollers is well known, and I do not claim any novelty in them.

The bifurcated plate Q', forming part of the block Q, is provided with pins $v$, to which the inner ends of the levers V of the first kind are pivotally attached, having their fulcrums in the bifurcated upper ends of fixed standards V' and connected at their other ends pivotally to vertical link-bars $V^2$, the upper ends of which are similarly connected to a horizontal bar W, carrying vertical plunger-bars X Z, reciprocating in guides $x$ $z$. Plunger-bar Z is provided at its lower end with a plunger-head Z', which enters the top of the casing J which is next to the heading-rollers and clamping and can-turning devices, and its function is to insure the proper position of the upper head or top of the can by pressing it gently and easily into its place on the shoulder of the casing. The plunger-head X' of bar X acts in like manner, enters each casing as it passes over opening Y, and gently forces the can down through the same, overcoming any resistance of the casing or any accidental obstruction. The aforesaid parts are so arranged that each upward movement of plunger-rod L' causes a much less downward motion of the plunger-bars X and Z, with the results above stated, and its downward motion restores them to their former position.

For certain kinds of work different forms and constructions of the upper chuck must be used. Thus for holding a can which has a reduced upper neck I recess the under side of the chuck, leaving only a peripheral shell, and fit into the recess a disk having a spring behind it, as shown in Fig. 15, so that the said disk will yield to the neck of the upper head or top of the can, permitting the peripheral shell $M^x$ of the chuck to rest solidly on the peripheral part of the head, as hereinbefore described. When the plunger or lower chuck L is withdrawn, the said spring returns the said disk to its former position, incidentally insuring the dislodgment of the can-neck from the said upper chuck, although gravity will ordinarily suffice for this purpose.

By a slight modification of this machine it may also be used for rolling a hollow wire on the upper edge of an open bucket or other vessel. To this end, as shown in Fig. 16, I supply the bottom of the upper chuck M with a series of downwardly-acting rollers $w'$ and hold and turn the bucket against said rollers by suitable means, thus forming a hollow wire thereon continuously and neatly. Of course the bucket cannot pass down through the casing, but must be lifted out of the machine. The chuck provided with hollow-wiring rollers, as above stated, I have designated $M^x$. For holding the can while it is acted on by the heading-rollers for the lower head I employ a second chuck $M^y$, having a smooth bottom without rollers and rotated by a shaft which is parallel to the shaft M aforesaid and driven by belt therefrom on pulleys. Of course a second corresponding lower plunger and shaft must also be employed, having devices for rotating and reciprocating them, substantially duplicating those already described as acting on shaft L. The closing-bar is adjusted so that it closes the casing J' tightly on the bucket, preventing its rotation, as already stated, while the action of the hollow-wire-forming rollers $w'$ continues, but leaving it free to rotate with the upper chuck $M^x$ and corresponding lower chuck, while the lower crimping-roller acts on the lower head, as before described.

Although the casings J have been described as cylindrical, it is obvious that they may be varied in form to suit the shape of the can or receptacle to be operated upon, and for similar reasons chucks and rollers of other forms than those above described may be substituted for particular uses. The two instances last above given will serve for examples.

Either the bottom head or cover or upper head alone may be crimped or double-seamed alone, the roller or rollers which should act on the other head being removed.

Although I have generally made use of the word "can" by way of instance, it is to be understood as including receptacles generally.

Instead of the external closing-bar K, I may utilize the cap $I^2$ for the same purpose, putting the hinged sections J' of the casings J on the inner side, the antifriction-rollers $J^3$ being presented inwardly by brackets $J^y$, longer than brackets $J^4$ to insure contact with the periphery of said cap, as shown on Fig. 21. This construction is, however, less satisfactory than that using the external bar K, since it is impracticable in the case of the former to provide for the radial adjustment before described for regulating the closing of the casing.

The operation of the machine has been sufficiently explained in describing its several parts. In general review it may be said that the bottom heads, bodies, and upper heads or top disks of the receptacles are successively supplied to the series of casings or pockets as they revolve, successively lifted by the lower plunger or chuck, clamped between it and the upper chuck, rotated by the chucks in contact with the crimping or double-seaming rollers, and when fully headed passed on to the opening Y, through which they pass out of the machine, while the heading-rollers after remaining in contact during the one rotation of each can are withdrawn, the plungers Z and X immediately before and after the heading insuring, respectively, the proper placing of the upper head and the prompt discharge of the can from the machine. For special work, such as forming hollow wire, the modifications of construction and operation have already been sufficiently indicated.

The size of the disk or carrier H and the number of pockets or casings J may be increased or diminished, the capacity of the machine being unlimited, except as to consideration of space, power, or convenience. So far as I am aware it is the first one equally well adapted to crimping and double seaming, the first to effectually protect the body of each can from being pressed out of shape or injured while being carried to the heading devices, the first to carry a circular series of rotating cans under automatic rotary clamping devices which turn them sucessively in contact with the operating-rollers and release them again when headed to be carried by the rotation of the disk over the discharge-opening, and the first to be equally available by slight changes of the chucks and other parts for forming a hollow wire on the edge of an open vessel or heading a can having a reduced neck, as well as for its more usual functions.

There are divers other novel features and capacities of the machine which need not be enlarged on here, as they will be more particularly pointed out in the claims.

The machine is exceedingly strong and compact, inexpensive to manufacture, durable, rapid, and reliable in action, and capable of turning out a very great quantity of excellent work for a very long period of use.

The adjustability of the pressure of the casings J and their internal smoothness allow the machine to be used with cans of delicate surface or fine ornamental labels without defacing or dimming them. The pressure being made as light as is consistent with holding them securely, the cans pass from the machine as bright as they entered it.

Having thus described my invention, what I claim as new, and desire to secure by Letters Patent, is—

1. In a can-heading machine the combination of a rotary can-carrying disk, tubular can-holding casings arranged in circular order thereon and having their axes vertically disposed so as to receive and keep in position by gravity the can head and body one over the other, a pair of automatically closing and opening chucks arranged to clamp the head and body of each can together at top and bottom and to release the can when headed, rollers for fastening the said head on the body, mechanism for rotating the said chucks and can, and means for automatically moving the said rollers laterally relatively to the can into and out of position to operate, substantially as set forth.

2. In a can-heading machine the combination of a rotary can-carrying disk, provided with tubular can-holding devices arranged with their ends upward and open so as to receive and keep in position by gravity the can heads and body one above the other, mechanism for rotating said disk, a pair of chucks arranged respectively above and below the said disk in a line with the path of the cans, means for closing the said chucks on the cans as these are brought successively between them, mechanism for rotating the said chucks and cans independently of the said disk and at a greater rate of speed, and devices arranged for lateral contact with the can-heads while thus held and operated, for the purpose of heading the cans, substantially as set forth.

3. In combination with the rotary can-carrying disk and mechanism for rotating the same, a circular series of can-holding casings or pockets mounted thereon, each of which has a tubular fixed portion, a segmental fixed portion above the tubular portion and a relatively movable segment coöperating with the fixed segmental portion to admit and clamp the can-body, and means for operating the movable segments, substantially as set forth.

4. In combination with a rotary can-carrying disk and mechanism for rotating the same, a circular series of can-holding casings or pockets mounted thereon, each of which is arranged with its end upward and open so as to receive and keep in position by gravity the parts of the can one above another, and each of which is provided with a laterally-movable segment and a fixed portion adapted to receive, guide and clamp the can-body, and means for automatically operating said movable segments, substantially as set forth.

5. In combination with a rotary can-carrying disk and mechanism for rotating the same, a series of can-holding casings mounted thereon and arranged with their ends upward and open so as to receive and keep in position by gravity the parts of the can one above another, each casing having a hinged section and an attachment extending out from such section, and a fixed curved device arranged at the side of said casings to be struck by such attachments as the disk rotates to close the hinged sections on the can-bodies and hold them so until the can is presented to the heading devices, substantially as set forth.

6. In combination with a can-carrying disk and mechanism for rotating the same, a series of can-holding casings mounted thereon, arranged with their ends upward and open so as to receive endwise and keep in position by gravity the parts of the can, one superposed on another, a hinged outwardly-opening section on each casing, a spring for opening the section to a limited extent, and means for closing the sections, substantially as set forth.

7. In combination with a can-carrying disk and mechanism for rotating the same, a series of can-holding casings or pockets each casing having a section hinged to open outwardly, a spring arranged to open said section to a limited extent and a roller projecting outwardly from said section, a curved bar arranged for contact with said rollers to close the said hinged sections and hold them closed until the incomplete cans are presented to the clamping-chucks and heading devices, and supports for said bar provided with radially-adjustable arms, whereby the bar may be adjusted to close the hinged sections of the casings to a greater or less degree, substantially as set forth.

8. In combination with a can-carrying disk and mechanism for rotating the same, a series of removable can-holding casings or pockets mounted thereon each casing having a section hinged to open outwardly, a spring to open said section to a limited extent, a roller projecting outwardly from said section, a curved bar arranged for contact with the said rollers to close the said hinged sections and hold them closed until the incomplete cans are presented to the heading and clamping devices and vertically-adjustable supports for the said bar whereby it is adapted at will to be used with lower or higher casings for cans of different sizes, substantially as set forth.

9. In combination with an automatic carrier, a series of can-holding casings carried thereby, rotary clamping devices and heading-rollers to which the cans held in said casings are successively presented and devices for automatically throwing said rollers in a lateral direction momentarily into contact with the heads of the can, the said casing being provided with openings to allow the passage of the said rollers for that purpose, substantially as set forth.

10. In combination with an automatic carrier, a series of can-holding casings carried thereby, each provided with a slot for the admission of the bottom head of a can and open at the top for the admission of the can-body and the upper head or top disk, and devices laterally movable relative to the can for heading the said cans as they are successively presented thereto.

11. A can-holding casing for a can-heading machine provided with a lateral slot above the bottom of the casing for the admission of the bottom head and having its lower part enlarged in internal diameter from said slot downward forming an annular shoulder which will prevent said disk from rising too far, substantially as set forth.

12. A can-holding casing for a can-heading machine having a slot above the bottom of the casing for the admission of the lower head, an open upper end for the insertion of the body and a hinged section above the said slot opening outward to permit the can-body to pass readily downward, closing the said slot, substantially as set forth.

13. A can-holding casing for a can-heading machine arranged with its end upward and open so as to receive and keep in position by gravity the parts of the can, superposed one over the other, said casing having an internal horizontal shoulder for the can-head to rest on, and having a fixed portion and a laterally-movable segment, the casing being adapted for coöperation with feeding and can-heading devices, substantially as set forth.

14. A can-holding casing for a can-heading machine arranged with its end upward and open so as to receive and keep in position by gravity the parts of the can, superposed one over another, said casing having two internal horizontal shoulders, one near the top of the casing and the other below the middle of the casing, and having a fixed portion and a laterally-movable segment, substantially as set forth.

15. A can-holding casing for a can-heading machine provided with a slot below its middle for the insertion of the bottom head, openings respectively at the top and below the said slot for the admission of the heading-rollers, a hinged spring-opened section to facilitate the admission of the can-body and internal shoulders to limit the movement of the heads substantially as set forth.

16. A carrier-disk provided with a circular series of holes in combination with casings open at the top and which are set into the said holes, a table or bed which is below the said disk and is provided with two holes registering with those of the said disk, one of which serves for the discharge of the headed cans, a plunger working up from below through the other hole, a chuck above the same against which the can is clamped by the lifting action of the said plunger which is also the lower chuck, means for rapidly rotating the said chucks and heading-rollers held in contact with the heads during one rotation thereof, substantially as set forth.

17. In combination with can-feeding mechanism having a tubular can-holding casing, a stationary rotating chuck, a reciprocating chuck arranged to clamp said cans between them as presented and a heading roller or rollers, thrown laterally and automatically into contact with the incomplete can while thus rotating in said casing substantially as set forth.

18. In combination with a supporting-table center bolt and circular cap keyed to said bolt, a can-carrying disk turning on a central bearing and supported by said table, said disk being provided with a circular series of holes and can-holding casings open at top and bottom to permit the action of the lifting and clamping devices, substantially as set forth.

19. In combination with a table having a raised central upper part and a bearing centrally raised thereon and centrally bored, a central bolt passing through the bore of the said bearing, a rotary can-carrier disk, having a hub which turns on said bearing and a downwardly-extending peripheral part overlapping the periphery of said raised part of the table, substantially as set forth.

20. In combination with can feeding and rotating devices a pair of rock-shafts provided with feed-arms, each of which is adapted to receive the supporting-rod of a pair of heading-rollers, a rod detachably fitted into one of the said arms, and mechanism for automatically rocking both the said shafts, so as to throw the rollers carried by the said rod into contact with each one of the cans during the rotation of the latter, substantially as set forth.

21. In combination with a rotary can-carrier disk and can-holding casings carried thereby, a pair of crimping-rollers arranged for contact with the heads of each can at a certain point of its travel, a rock-shaft and intervening attachments whereby at regular intervals the said rollers are thrown simultaneously toward each other into position for such action and away from each other out of position, and mechanism for automatically operating the said parts, substantially as set forth.

22. In combination with a can-carrier, a plunger operating upward through the bottom thereof, a shaft-cam and retracting-springs for reciprocating the said plunger, a stationary upper chuck and means for rotating the said upper chuck and plunger when the can is clamped between them, and heading devices movable laterally toward each other on different sides of the can for acting on the can-heads during such rotation, substantially as set forth.

23. In combination with a can-carrier and a series of can-holding pockets or casings carried thereby and open at the upper end, a plunger working a short distance down into each casing after the upper head is introduced to insure the accuracy of its position, mechanism for automatically reciprocating the said plunger at the proper intervals and subsequently acting can-rotating chucks to which the can is presented by said carrier after the withdrawal of the said plunger, substantially as set forth.

24. In combination with a can-carrier having a series of holes formed therein, a series of can-holding casings attached by their lower ends to the carrier and open at top and bottom, a table or bed having a discharge-opening registering with said holes as they successively come over it, a plunger reciprocating at regular intervals and pressing on each can to insure its dislodgment from the carriage as it comes over said discharge-opening, mechanism automatically operating the said plunger and heading-rollers acting laterally on the can above said carrier substantially as set forth.

25. A pair of vertical reciprocating downward-acting plungers, one being arranged to press on the head of an incomplete can and insure its accurate position in the casing before heading, and another being arranged to act on the can after heading and as it comes over the discharge-opening in combination with devices connecting the said plungers, mechanism for operating them simultaneously, a rotary can-carrier, a series of can-holding casings mounted thereon and open at top and bottom in line with holes in said carrier and a bed or table for said carrier, having a discharge-opening registering with the said holes substantially as set forth.

26. A can-holding casing for a can-heading machine provided with lateral openings between the ends of the casing and extending for a portion only of the circumference of the casing, for the admission of heading devices, substantially as set forth.

27. A rotary carrier for can-heading machines, having tubular casings provided with lateral openings above said carrier for the admission of the can-heading devices.

28. In a can-heading machine the combination of a rotary carrier, tubular casings thereon having lateral openings, means for rotating the can while in one of said casings, heading-rolls, and means for advancing said rolls to operate on the can through said openings.

29. A can-holding casing for a can-heading machine, provided with a slot above its bottom for the insertion of the bottom can-head, and lateral openings for the admission of the top and bottom heading-rollers.

30. A can-holding casing for a can-heading machine provided with a slot above its bottom for the insertion of the bottom can-head, lateral openings for the admission of the top and bottom can-heading devices, and internal shoulders to limit the movement of the can-heads, substantially as set forth.

31. A can-holding casing having a fixed portion, a laterally-movable segment, and lateral openings above the lower end of the casing for the admission of the can-heading devices, combined with a rotary carrier to which said fixed portion is removably attached at its lower end, substantially as set forth.

32. A can-holding casing, having a laterally-movable segment to release or hold the can, internal shoulders to limit the movements of the can-heads, and lateral openings near said shoulders to allow the operation of heading-rolls, substantially as set forth.

33. In a can-heading machine the combination of a rotary carrier, tubular casings thereon having laterally-movable segments and having lateral openings, means for rotating the can while in one of said casings, heading-rolls, and means for advancing said rolls to operate on the can through said openings, substantially as set forth.

34. In a can-heading machine the combination with means for applying a can-head, of a casing arranged with its end open and upward so as to receive and keep in position by gravity the parts of the can superposed one over another, said casing having a lateral opening above its bottom and a tubular portion below said opening for receiving a can-head, and having a movable side portion or segment for clamping the can-body, substantially as set forth.

35. A can-holding casing arranged with its end upward and open so as to receive and keep in position by gravity the parts of a can superposed one over another, said casing having a fixed portion and a laterally-movable segment J′, a horizontal shoulder J⁷ near the upper end and a horizontal limiting-shoulder J⁵, substantially as set forth.

36. In a can-heading machine the combination of a rotary can-carrier, the upper rotary chuck, the lower rotary chuck, a power-shaft below said carrier, a ratchet mechanism for rotating the carrier, a lever connected with the ratchet mechanism and cams on said shaft for respectively operating said lever and raising the lower chuck, substantially as set forth.

37. In a can-heading machine the combination with a rotary carrier, and heading-rolls, of an upper rotary chuck, a lower rotary and vertically-movable chuck, and a presser operating oppositely to the movement of the lower chuck to position the parts of the can before their elevation by the lower chuck, substantially as set forth.

38. In a can-heading machine the combination of an upper rotary chuck, a downwardly-movable presser, a supporting-table having a perforation opposite the rotary chuck and imperforate opposite to said presser, a rotary carrier having tubular can-holding casings over said table, and adapted to carry unheaded cans below said presser and chuck successively, a lower rotary chuck, and heading-rolls for operating on the can while held by said chucks, substantially as set forth.

39. In a can-heading machine, the combination with means for applying a can-head, of a casing for holding the can-body and a presser Z′ independent of the heading means for positioning the parts of the can longitudinally in said casing, substantially as set forth.

40. In a can-heading machine, the combination with means for applying a can-head and a rotary feeding-carrier, of two plungers, one at each side of the heading means acting respectively to press the can parts into position before the heading operation and to force the headed can from said carrier, substantially as set forth.

41. In a can-heading machine the combination of a rotary can-carrier, can-rotating chucks operating oppositely above and below the table, devices for bending the edge of the can-head, means for elevating the lower chuck, and downwardly-acting can pressing and ejecting devices operated by said elevating means.

42. In a can-heading machine the combination of a can-carrier, a heading mechanism adapted to operate on the can in said carrier and two connected plungers one at each side of the heading mechanism, as and for the purposes set forth.

43. In a can-heading machine the combination of a rotary can-carrier, the upper rotary chuck, the lower rotary chuck, the pressing and ejecting plungers Z′ X′, the bar W connected with said plungers, the levers V connected with said bar, and mechanism for operating said levers and elevating the lower chuck.

44. In a can-heading machine the combination of a rotary can-carrier having can-holding tubular casings, means for elevating a can in one of said casings in a direction parallel with the axis of the carrier, a roll for acting on the edge of the can-head, and means for forcing said roll against the can after it has been so elevated and while it is rotated, substantially as set forth.

45. In a can-heading machine the combination of a rotary can-carrier, means for rotating the can, two sets of heading-rolls, separate oscillating supports for said rolls by the movement of which both sets of rolls can be pressed against the edge of the can-head from opposite directions, and mechanism for operating said supports to bring both sets of said rolls simultaneously and oppositely into operation, substantially as set forth.

46. In a can-heading machine the combination of a rotary can-carrier, tubular casings thereon adapted to hold and release the cans, the upper and lower rotary chucks, the shafts S S′ near said chucks and adapted to receive crimping or double-seaming rolls, and means for turning said shafts in opposite directions, substantially as set forth.

GEORGE J. RECORD.

Witnesses:
ALLEN M. COX,
HAROLD WILSON.